United States Patent
Kopylovitz et al.

(10) Patent No.: US 6,732,194 B1
(45) Date of Patent: May 4, 2004

(54) METHOD AND APPARATUS FOR MULTI-SEQUENTIAL DATA OPERATIONS

(75) Inventors: Haim Kopylovitz, Brookline, MA (US); Robert S. Mason, Jr., Uxbridge, MA (US); Adi Ofer, Wellesley, MA (US)

(73) Assignee: EMC Corporation, Hopkinton, MA (US)

( * ) Notice: Subject to any disclaimer, the term of this patent is extended or adjusted under 35 U.S.C. 154(b) by 545 days.

(21) Appl. No.: 09/893,295

(22) Filed: Jun. 27, 2001

(51) Int. Cl.[7] ................................................ G06F 3/00
(52) U.S. Cl. .................. 710/5; 710/7; 710/36; 711/113; 711/148
(58) Field of Search ................ 711/113, 148; 395/850; 710/5, 7, 36

(56) References Cited

U.S. PATENT DOCUMENTS

| | | | | |
|---|---|---|---|---|
| 5,644,786 A | * | 7/1997 | Gallagher et al. | ............ 710/30 |
| 6,457,097 B1 | * | 9/2002 | Tamura | ...................... 711/113 |
| 6,553,464 B1 | * | 4/2003 | Kamvysselis et al. | ...... 711/148 |
| 6,567,865 B1 | * | 5/2003 | Araki et al. | ................... 710/36 |
| 6,640,280 B1 | * | 10/2003 | Kamvysselis et al. | ...... 711/113 |
| 2003/0056032 A1 | * | 3/2003 | Micalizzi et al. | .............. 710/5 |

OTHER PUBLICATIONS

Pending U.S. patent application No. 09/801,252, filed Mar. 7, 2001, Obtaining Data from a Remote Data Storage Device.

Pending US patent application No. 09/891,110, filed Jun. 25, 2001, Obtaining Data from A Remote Data Storage Device Using Multiple Jobs Per Device on RA.

Pending US patent application No. 09/891,143, filed Jun. 25, 2001, Multiple Jobs Per Device on RA.

* cited by examiner

*Primary Examiner*—Jeffrey Gaffin
*Assistant Examiner*—Justin Knapp
(74) *Attorney, Agent, or Firm*—Choate, Hall & Stewart

(57) ABSTRACT

Described are techniques for performing multi-sequential I/O operations in connection with data requests involving a data storage device. An single data request may involve more than a one portion of data associated with a single job record, such as a single request may involve more than a single track of data of a logical device. A single job record corresponds to a single track. A data structure arrangement is disclosed that includes multiple job records corresponding to the single data request involving more than a single track of data. The multiple job records for a single data request are connected together in a data structure arrangement that may be used in connection with a single read operation involving more than a single track of data. This data structure may also be used in connection with storing a plurality of pending write requests, such as in connection with writing data from cache locations to a plurality of tracks of a particular device in which the plurality of pending write requests are represented as a single data request.

34 Claims, 11 Drawing Sheets

METHOD AND APPARATUS FOR MULTI-SEQUENTIAL DATA OPERATIONS

BACKGROUND

1. Technical Field

This application generally relates to computer systems, and more particularly to processing data requests in a computer system.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

One problem in servicing data operations is providing an efficient technique for handling multiple requests that may be received in connection with a single device or volume on a data storage system. In particular, this may be of concern in a computer system having multiple host systems accessing data in one or more shared storage devices. Data requests may include data stored on volumes of a device, as well as data that may be stored in a cache. Additionally, a data request may include a varying amount of data. A single data request may involve a large amount of data spanning multiple units of a particular device, for example, such as multiple tracks of a volume of a device. A single data request may also involve only a single track of data of a volume or device.

Thus, it may be desirous and advantageous to have an efficient and improved technique for processing different types of data requests involving varying amounts of data that may be stored in different physical locations and devices shared by one or more systems.

SUMMARY OF THE INVENTION

In accordance with one aspect of the invention is a method executed in a computer system for servicing a data request in connection with a storage unit. The method includes: determining whether the data request involves a plurality of data units; allocating, in response to determining that the data request involves a plurality of data units, a plurality of job records in connection with the data request, each of said plurality of job records associated with a particular one of said plurality of data units, said storage unit including a plurality of said data units; and storing a pointer to each of the plurality of job records in a device record associated with the particular storage unit, each of said job records indicating a first of said plurality of job records as a head of a list formed by said plurality of job records, each of said job records indicating which of said plurality of job records follows said each job record in said list.

In accordance with another aspect of the invention is a computer program product for servicing a data request in connection with a storage unit. The computer program product includes machine executable code for: determining whether the data request involves a plurality of data units; allocating, in response to determining that the data request involves a plurality of data units, a plurality of job records in connection with the data request, each of said plurality of job records associated with a particular one of said plurality of data units, said storage unit including a plurality of said data units; and storing a pointer to each of the plurality of job records in a device record associated with the particular storage unit, each of said job records indicating a first of said plurality of job records as a head of a list formed by said plurality of job records, each of said job records indicating which of said plurality of job records follows said each job record in said list.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
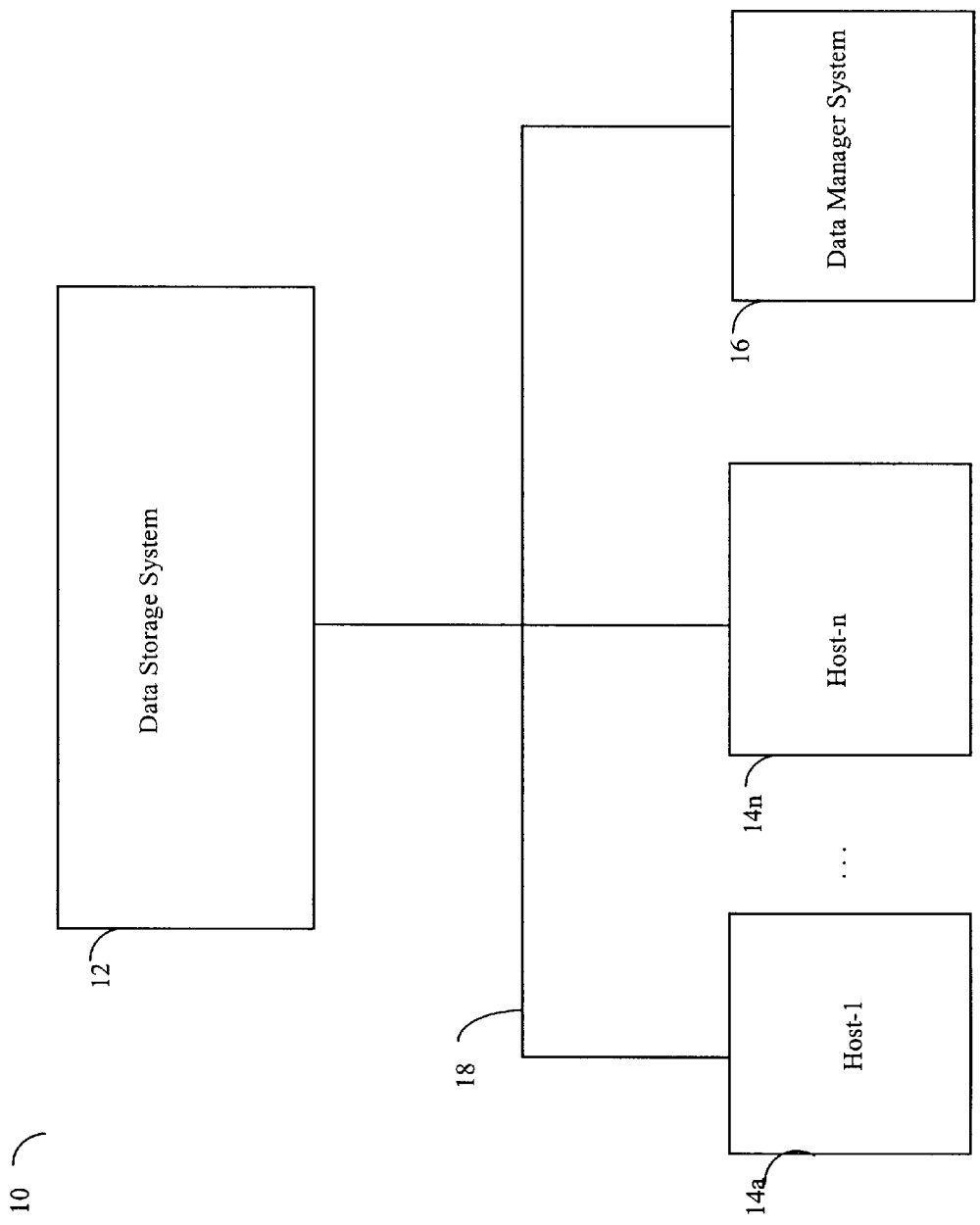
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
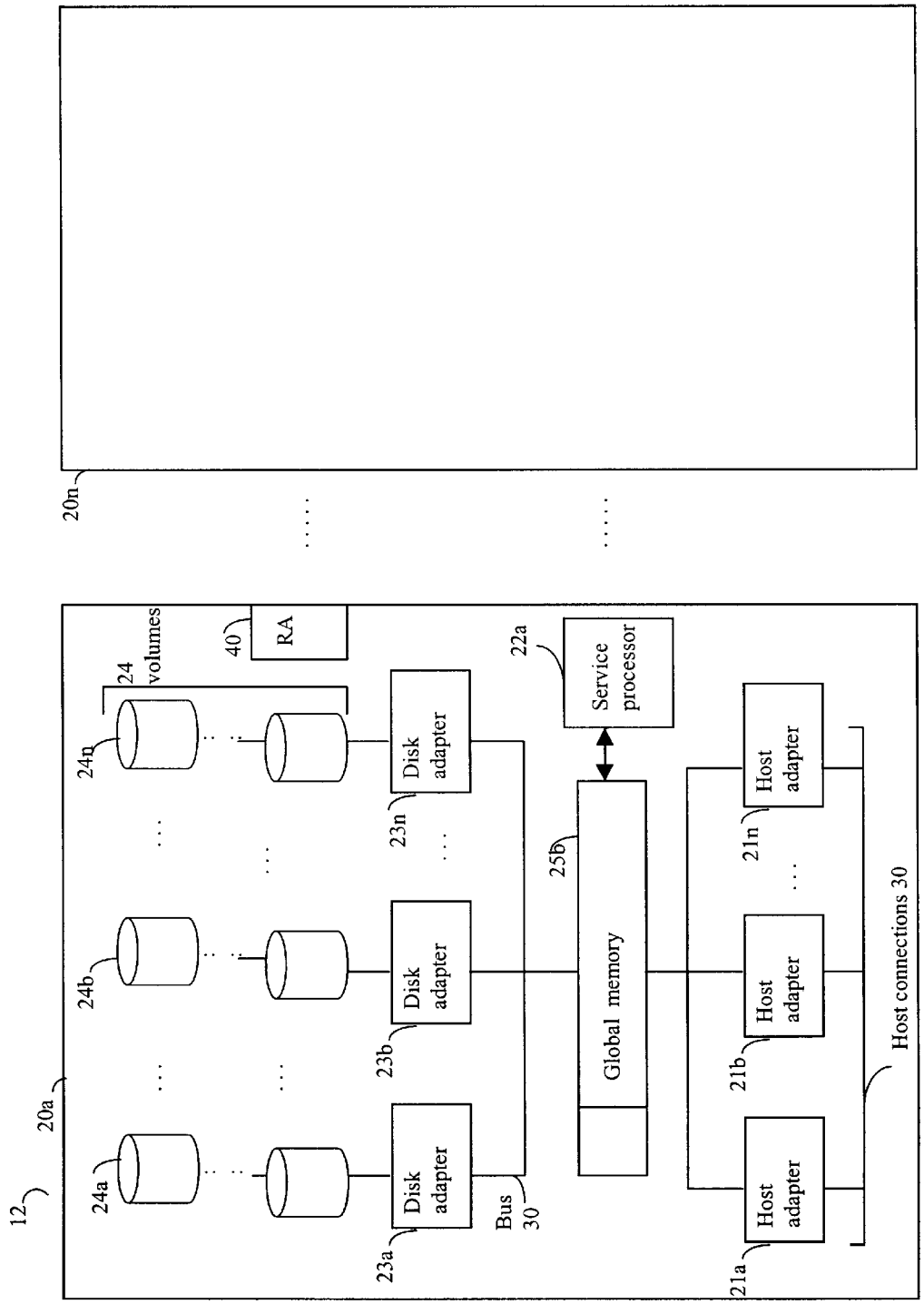
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the global memory 25b, for example, in communications with other disk processors or directors, and other components of the system 20a. Generally, the global memory 25b may be used in facilitating communications between components in the system 20a.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units (LUs). The LUs may or may not correspond to the actual disk drives. For example, one or more LUs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

Figure 3:
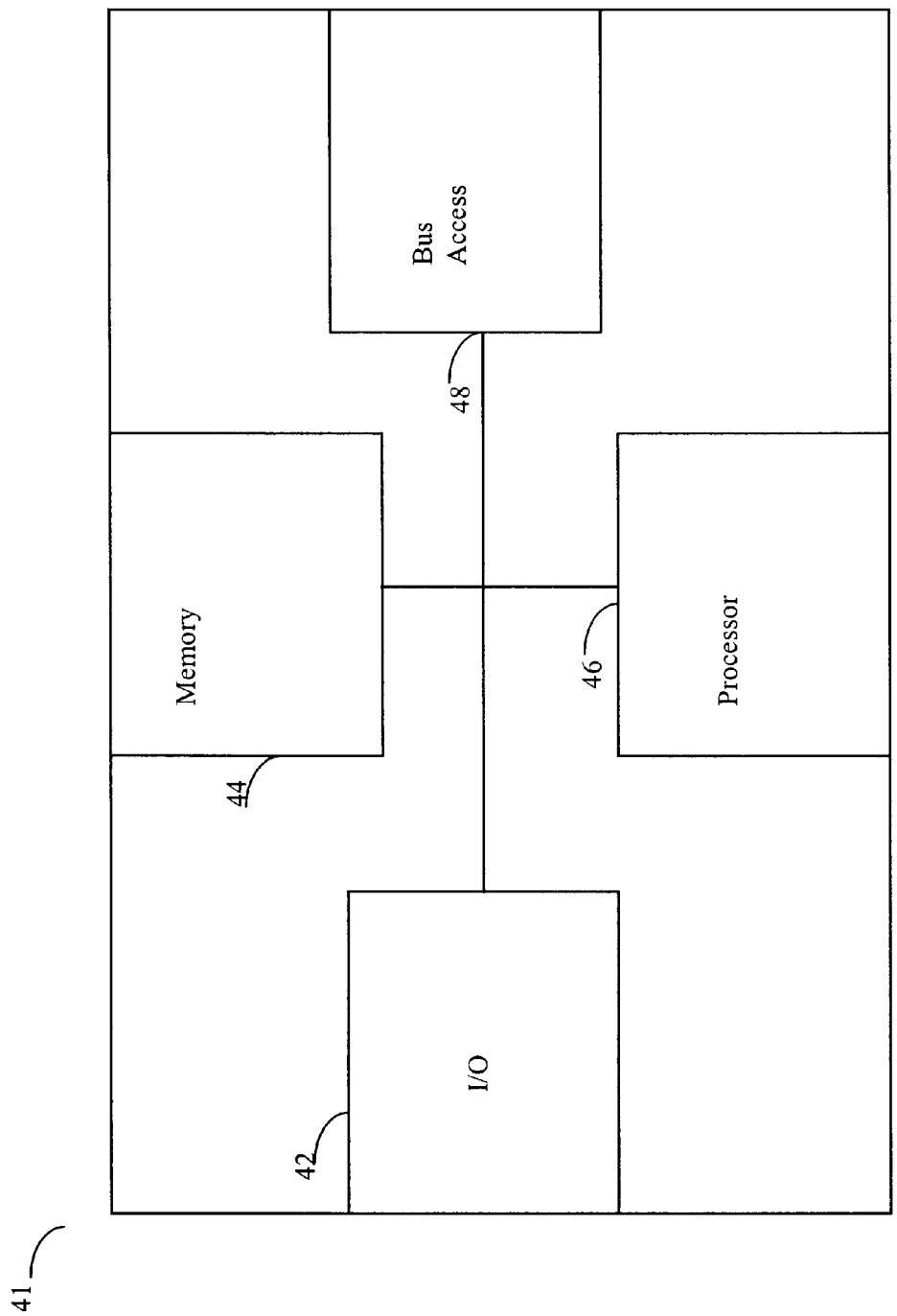
FIG. 3 is an example of an embodiment showing more detail of a remote adapter (RA) used in connection with communications between data storage systems.

Referring now to FIG. 3, shown is a more detailed illustration of what may be included in one embodiment of a DA, such as a DA 23a. Each DA 50 may include a processor 46, local memory 44, I/O interface circuitry 42, and bus access circuitry 48. The local memory 44 is coupled to the processor 46 and includes local data used by the DA 50. The memory may include volatile portions that are read to, and written from, by the processor 46 and non-volatile portions that contain data used by the processor 46. It should be noted that the processor may be a conventional processor that performs functions for the DA as described herein.

The I/O interface circuitry 42 may be used in receiving and sending data, for example, between the DA and a volume(device) and other elements of the data storage system. The I/O interface circuitry 42 and the bus access circuitry 48 are coupled to and controlled by the processor 46 in connection with data operations between the DA and other portions of the data storage system. In particular, the bus access circuitry provides the DA with access, for example, to the bus 30 in connection with performing data transfer operations with other DAs and global memory.

Figure 4:
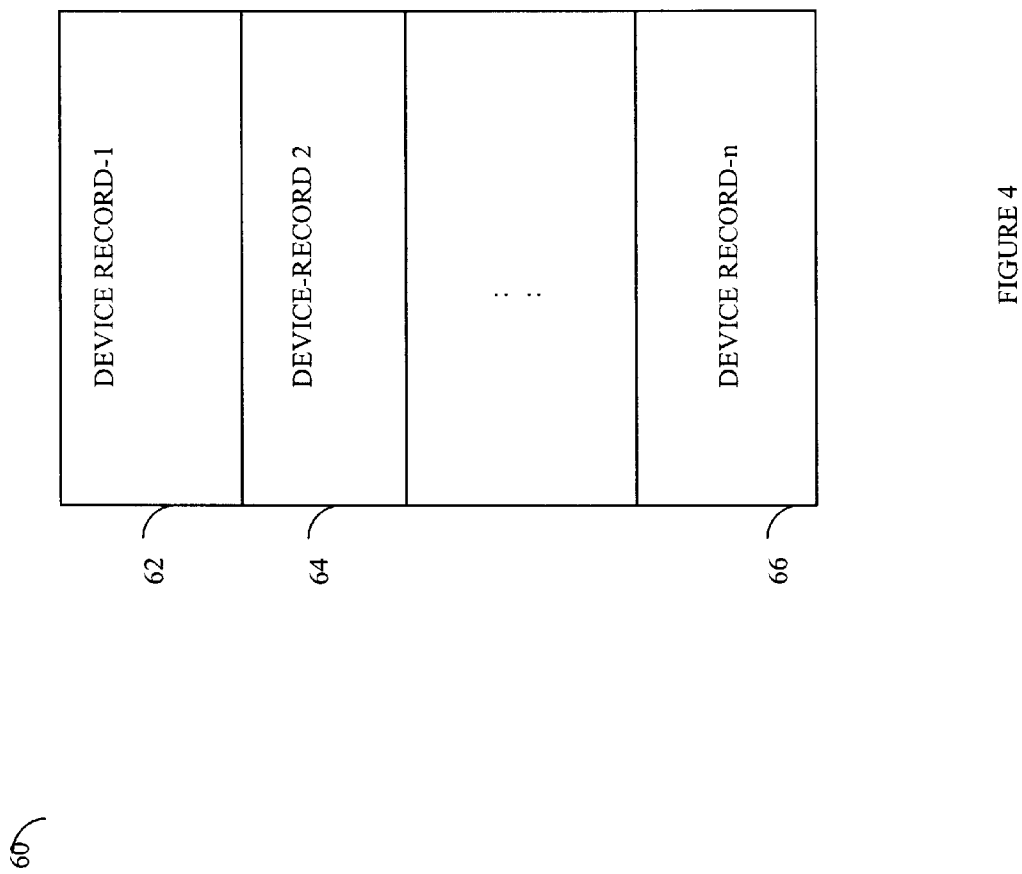
FIG. 4 is an example of an embodiment of an array of device records.

Referring now to FIG. 4, shown is an array of device records 60. The array of device records may be included in and managed by each DA. The array 60 includes a first device record 62, a second device record 64 and an n-th device record 66. There is one device record for each LV (device) that is accessed by the corresponding DA. For example, if DA 23a accesses a plurality of LVs corresponding to the elements shown in column 24a of FIG. 2, then a device record is included in the array 60 for each such LV. In the event that a particular LV is not accessed by the DA 23a or are not present, then the corresponding device record entry in the array 60 may include a null indicator or the like. Otherwise, the corresponding device record includes data for the LV.

The software used in connection with the DAs is discussed in more detail hereinafter. Generally, the DAs are used in connection with data requests involving the associated disk drive(s).

Figure 5:
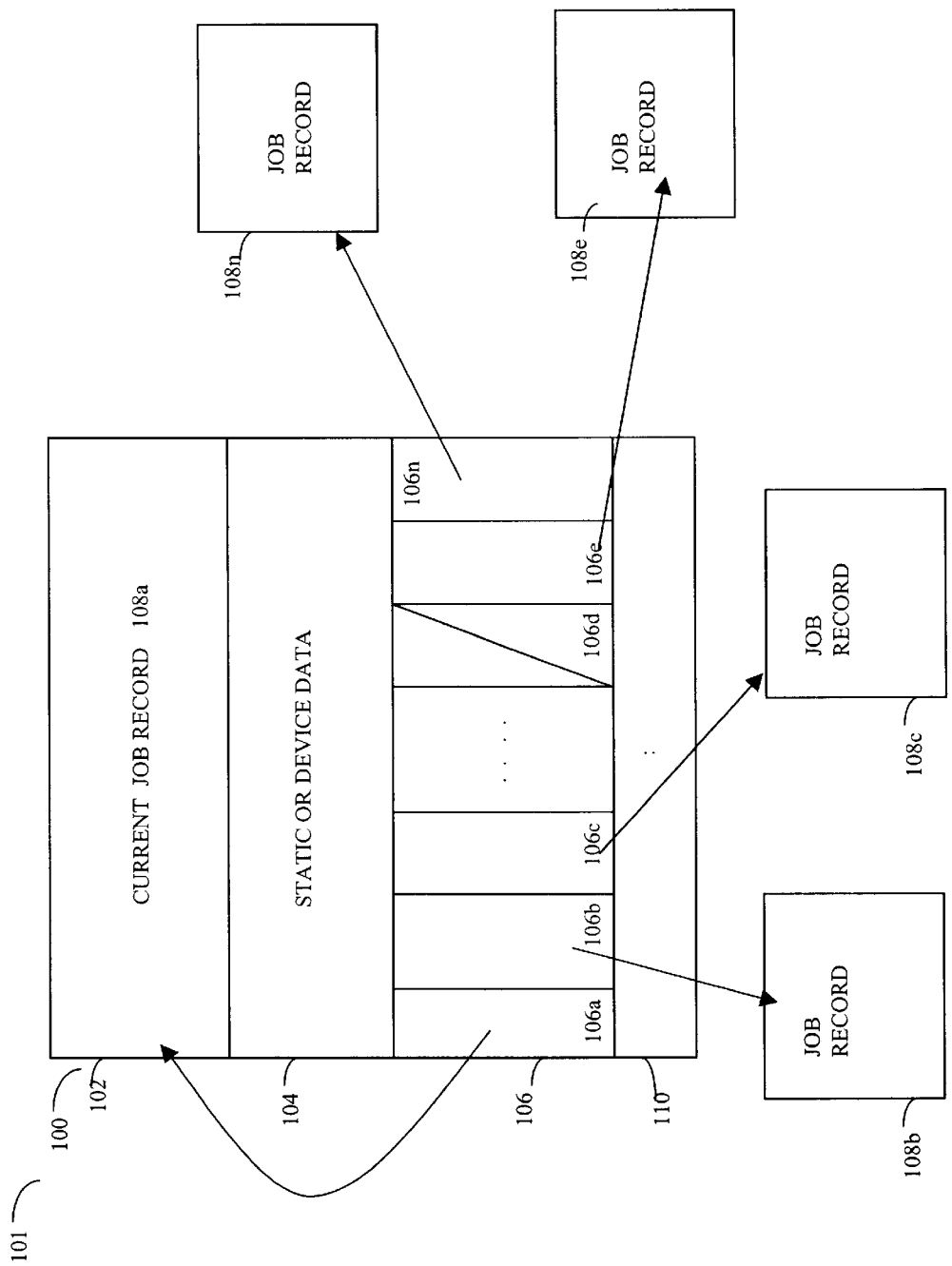
FIG. 5 is an example of a data structure arrangement that may be used in connection with servicing data requests of a device associated with a particular device record.

Referring now to FIG. 5, shown is an example of an embodiment 101 of a device record 100 and associated job records 108a–108n at a particular point in processing. The device record 100 includes a current job record portion 102, a static or device data portion 104, and an array of pointers to job records associated with that particular device record 100. It should be noted that the device record 100 also includes an additional data portion 110. This additional data portion 110 may include other data and information as related to this particular device record. The particular information included in portion 110 may vary in accordance with each embodiment.

The current job record portion 102 includes an instance of a job record currently being processed for the particular device corresponding to the job record 100. In this example illustrated in FIG. 5 in the arrangement 101, job record 108a is included in the portion 102. Additional job records 108b, 108c, 108e and 108n are also associated with the particular device having device record 100. Each of these additional job records currently being utilized and associated with data requests to be processed by the device associated with the device record 100 are indicated by a pointer in the array 106. Generally, the array 106 is an array of pointers identifying those job records associated with a data request in connection with the device associated with device record 100. In this example, the current job record which is 108a is identified by element 106a of the array 106. Similarly, other job records are associated with corresponding pointers in the array 106.

It should be noted that array element 106d includes a slash ("/") in the record field indicating that there is a NULL pointer, or no association, with job record. The NULL pointer or other suitable indicator may be used in an embodiment to indicate an array element having no associated job record.

In this example, the current job record 108a included in portion 102 of the device record 100 is a copy of the data of a particular job record that is currently being processed or serviced by the device corresponding to the record 100. As the current job record indicated by 108a is serviced and completed, another job record, such as 108b or 108c, for example, may be copied into the current job portion 102 indicating that the associated data request, or portion thereof associated with the job record, is currently being serviced by the device associated with the record 100. It should be noted that other embodiments may also indicate the current job record being serviced using other techniques. For example, an embodiment may include a pointer in field 102 to the job record rather than copy data to the field 102.

The current job record portion 102 may include dynamic information such as that connected with the job currently being serviced by the device associated with record 100. The information stored in a job record may include, for example, block access information as well as other job specific information, such as a pointer or an address of data in cache, a particular memory address such as a logical volume and track number, an indicator as to the size or amount of the data, and the like. The static or device data 104 includes device characteristics and other information which, for example, are not job related, such as device specific characteristics and information.

As will be described in following paragraphs, various details of the device and/or job records and relationships between them have been omitted from the representation 101 of FIG. 5 for the sake of simplicity. However, these details are described hereinafter in more detail in paragraphs that follow.

Job records may be obtained from a pool of existing or available job records. In other words, there may be a pool of job records created and available for use. When job record or records are needed, these may be allocated from the pool. Similarly, when a job has been serviced and all associated record or records serviced, these job records may be released for subsequent use in connection with other jobs and other operations.

It should be noted that the length of the array 106 may vary in accordance with each particular embodiment. For example, in one embodiment, the length of the array may include up to sixteen (16) pointers. The size of the array may be defined in accordance with a configuration parameter. For example, in one embodiment related to a Symmetrix data storage system, the size of the array 106 may be configurable in accordance with a system configuration file parameter by a customer. It should be noted that other values and maximum sizes besides sixteen (16) may be used in connection with the parameters specifying the length of the array 106 and should not be construed as a limitation in accordance with principles described herein.

Generally a job record, such as one of 108a through 108n, may be used to track access of data in connection with a data request. For example, job records may be used in connection with tracking the location of data associated with a particular data request such as data that may be read from a cache, or data that may be read from a disk or other device. Additionally, a job record may be associated with different types of I/O operations of a data request, such as read and/or write operations in connection with data that is written to/read from a cache and/or disk. A job record may include various information in accordance with describing an I/O operation in connection therewith. For example, job record may also include the identifier of a particular track such as which cylinder and head correspond to a particular track, meta-track data, commands to a particular drive, a task number, an identifier indicating a read or write operation, an amount of data to be transferred such as a number of blocks or bytes, and the like.

It should be noted that although the length of the array 106 may be a configurable parameter, an embodiment may have an upper bound that may vary in accordance with a hardware characteristic or limitation.

One job record may be associated with each particular track on the device or LV being accessed. For example, in this embodiment one track of data as may be stored on an LV is equivalent to 32K bytes of data.

Data associated with a single data request or operation may exceed the size of a single track or be greater than 32K as in this example, or span multiple volume tracks. The foregoing data structure shown in connection with FIG. 5 representing the different job records associated with a particular device record may be used in connection with describing an data request that involves more than a single track of data. For a data request that involves a single track of data or a portion thereof, a single job record may correspond to servicing this data request. However, if a data request, such as a in connection with a read operation, involves data on multiple tracks, a plurality of job records may be associated with a single request. What will now be described in connection with figures in paragraphs that follow is a representation of a single request that spans multiple tracks using a variation of the foregoing arrangement 101 described in connection with FIG. 5. A single request that involves multiple tracks may be represented by a plurality of job records connected together to service and represent the single request.

Figure 6:
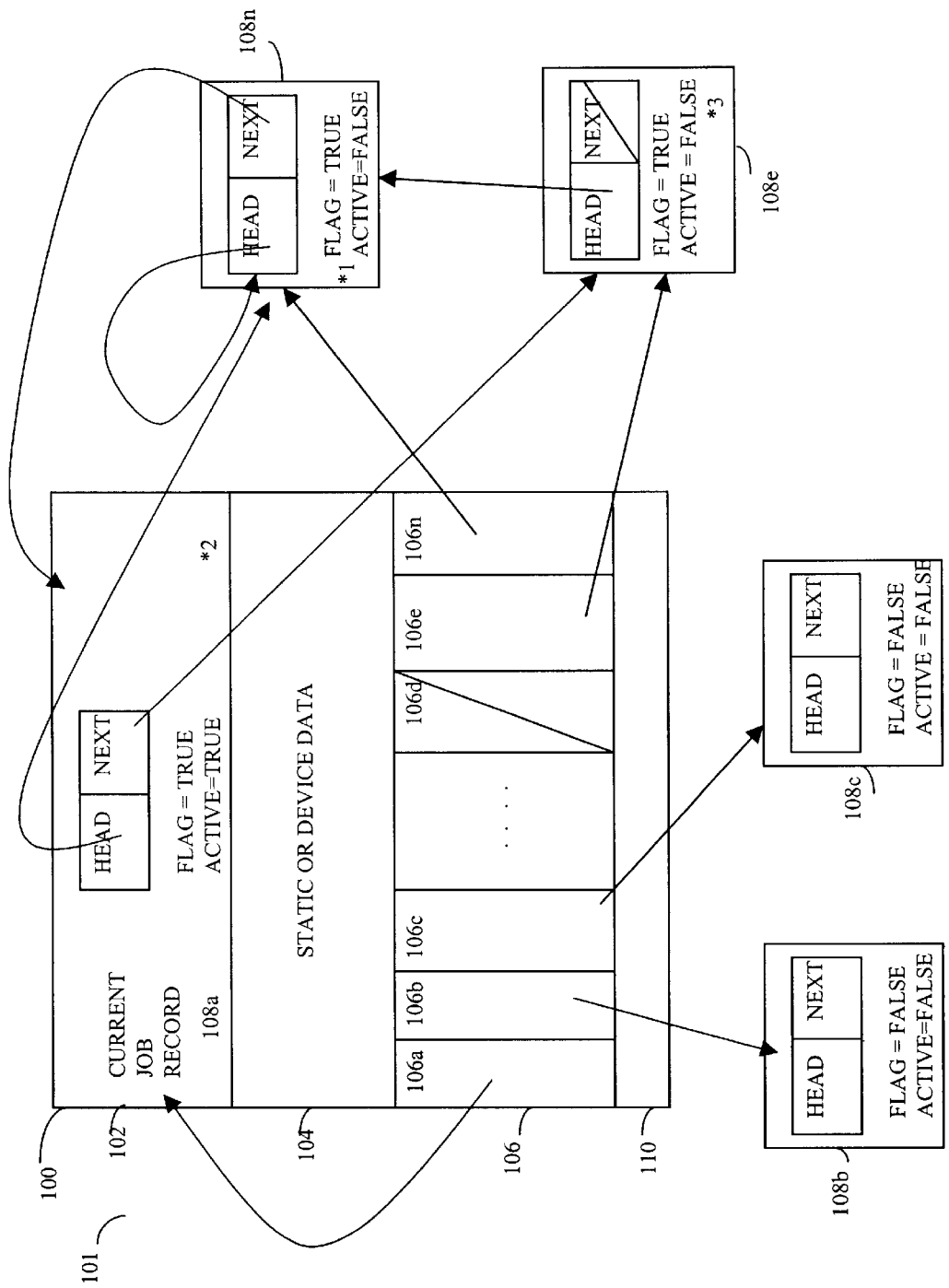
FIG. 6 is an example of a more detailed data structure arrangement of that described in connection with FIG. 5.

Referring now to FIG. 6, shown is a more detailed representation of the device record 100 and the associated job records 108a through 108n previously described in connection with FIG. 5. Additional details and information as to what may be included in a particular embodiment of the job records is described and shown in connection with FIG. 6. In particular, each of the job records includes a "head" pointer and a "next" pointer and additionally includes two boolean values, "flag" and "active". The pointers "head" and "next" as well as the boolean variable "flag" may be used in connection with combining multiple job records to correspond to a single data request which may span, for example, more than a single track or granularity of data corresponding to a single job record.

It should be noted that the boolean "flag" may be used in connection with performing various processing steps within an embodiment. One embodiment uses this flag in connection with servicing an I/O request. For example, by examining this field within a job record, a determination may be made that there may be additional job records to be processed in connection with completing data transfers of the single I/O request. "Flag" may also be examined in connection with performing I/O recovery operations as well.

It should be noted that the data structure depicted in connection with FIGS. 5 and 6 show a "snapshot" or an instance of the data structure at a particular point in processing of data requests of the device record 100. At a different point in time, for example, in connection with servicing a different I/O requests or a different portion of the same data request, the snapshot and accordingly the data structures may differ. In the snapshot shown in detail in connection with FIGS. 5 and 6, the device associated with device record 100 is currently servicing the data request associated with current job record 108a. As will be explained in more detail in paragraphs that follow, job record 108a is related to, and used in connection, with job records 108n and 108e to represent a single data request currently being processed. Also shown in connection with FIG. 6 are two other data requests. In particular, a second IO request is associated with a single job record 108b and a third data request is associated with a single job record 108c.

In this example, the job record currently being serviced has the "active" boolean variable set to true. The "active" boolean variable as may be included in each job record is used to represent the state of whether a job is active in connection with the context of an I/O operation rather than with a particular device. In particular, the active flag may be used to identify a point in processing a particular request, for example, in connection with failure and recovery operations that may be included in a particular embodiment. Other mechanisms and techniques may be used in connection with such operations.

Job records 108a, 108n and 108e are used in connection with representing a single data request that in this example spans three tracks of a particular volume. In particular, the notation "*1", "*2" and "*3" are used, respectively, next to job records 108n, 108a and 108e to indicate an ordering represented by the various pointers within each of the job records. These multiple job records are connected in that particular order, 108n, 108a, and 108e, to represent the ordering of multiple tracks associated with a particular single data request. These job records are connected together using the "head" and "next" pointers as included in the job records. In particular, the head pointer of each of records 108a, 108n and 108e identifies record 108n as being the "head" or first element in the list of job records for the single data request. Accordingly, each of the "head" fields of the records 108a, 108n and 108e point to, or identify, record 108n as the first element or head of the list. The "next" field of each of the records points to or identifies a following or subsequent job record in the list corresponding to the tracks associated with the single data request. In particular, record 108n identifies the next element using the "next" pointer of job record 108a. Similarly, the "next" field of job record 108a identifies record 108e as the third and final element in the list following job record 108a. The next field of the last record 108e includes a NULL pointer or other suitable indicator signifying the end of the list of job records associated with a single data request.

Additionally, the "flag" boolean is set to true in all of those job records associated with a single data request involving multiple job records. In this example, records 108a, 108n and 108e have their "flag" fields set to true as they are associated with a single data request represented by multiple job records. In contrast, each of the job records 108b and 108c are associated with a single data request not involving more than a single track of data, and thus, have their "flag" fields set to false.

In the foregoing example represented in FIG. 6, the three records 108a, 108n and 108e may correspond to an data operation involving three job records where the data request is for a data read or for performing a read operation. The snapshot of FIG. 6 indicates that the second portion or job record is currently being serviced, processed, or read. If the I/O operation associated with the multiple job record linkage data structure is a read operation, each job record corresponds to a track of data in which the track number increases as the ordinal number corresponding to the position of an element in the list of job records increases. For example, the track number associated with the second element of the list is greater than that associated with the first element of the list of job records for the associated data request.

Each of the job records associated with a read request may identify data that is stored in the cache or on a particular device, volume and the like, such as an LV or other designation. In connection with a read operation an indication of success and completion of the operation being performed is sent accordingly when the data is sent in response to servicing the read request.

In an embodiment, write operations may be performed mostly to cache without requiring a host issuing the request to wait for data to be written to the actual data storage device. Rather, an embodiment may include a write policy whereby the data associated with a write operation is initially written to a cache. Accordingly the host is notified that the write operation is complete upon data being written to the cache. As time allows and in accordance with each particular embodiment, the data stored in the cache is actually written to the particular device locations. One embodiment may send write operations one track at a time. However, there are instances where a cache may include too many write pending operations, for example, such as when there is no more room in the cache for storing data of write operations. At this point, a portion of the write operations and data updates included in the cache may be written to the particular LV. If there are too many write pending operations, for example, in connection with too much data stored in a cache that needs to be written to an actual device or LV, the data request described herein in connection with multiple job records may be used to update storage devices. All of the pending writes, for example, associated with tracks on an LV may be issued in a single write command.

Use of the multiple job records in updating a device with multiple write pending operations, for example, as may be stored in a cache provides an arrangement for updating a device with a single data operation. By combining multiple pending write operations to a plurality of different tracks of a single device into a single data request, the overhead associated with only a single write operation may be incurred to actually update multiple tracks on a particular device. The multiple write pendings may be treated as a single large data request where the request is a write operation involving multiple tracks to a particular device.

It should be noted that in the foregoing description that the information and data structures may be stored in the memory that is local to each particular DA, such as memory 44. Additionally, each particular DA may include the appropriate instructions and execute the appropriate instructions in management and maintenance of the foregoing data structures.

An embodiment may include several background processes that perform integrity checks in connection with pointers used in connection with the data structure arrangement of FIGS. 5 and 6. For example, pointers may be checked to insure that the pointers identify valid data addresses.

The foregoing data structure arrangement in which multiple job records in the form of a list are associated with a single request may be traversed in a single direction in connection with the management operations and uses associated therewith. For example, with the "next" and "head" pointers, the list may only need to be traversed in the forward direction in connection with servicing each job record of the list. Similarly, in connection with data structure management operations, such as "clean up" of the job records upon completion of servicing a data request, may be performed by traversing the list of job records in a single direction.

It should be noted that other embodiments may include variations in the foregoing data structure arrangement. Each embodiment may also include maximum levels that may vary in accordance with each embodiment. For example, an embodiment may include a configurable parameter that may have a maximum value in accordance with hardware limitations of a particular embodiment, such as previously described in connection with the array of pointers 106 of FIGS. 5 and 6. An embodiment may include other varying limitations and characteristics, for example, such as in connection with the maximum number of sequential data requests associated with a particular device and device record.

What will now be described in connection with FIGS. 7–11 are flowcharts describing methods that may be included in an embodiment in connection with processing a data request in the computer system 10 of FIG. 1.

Figure 7:
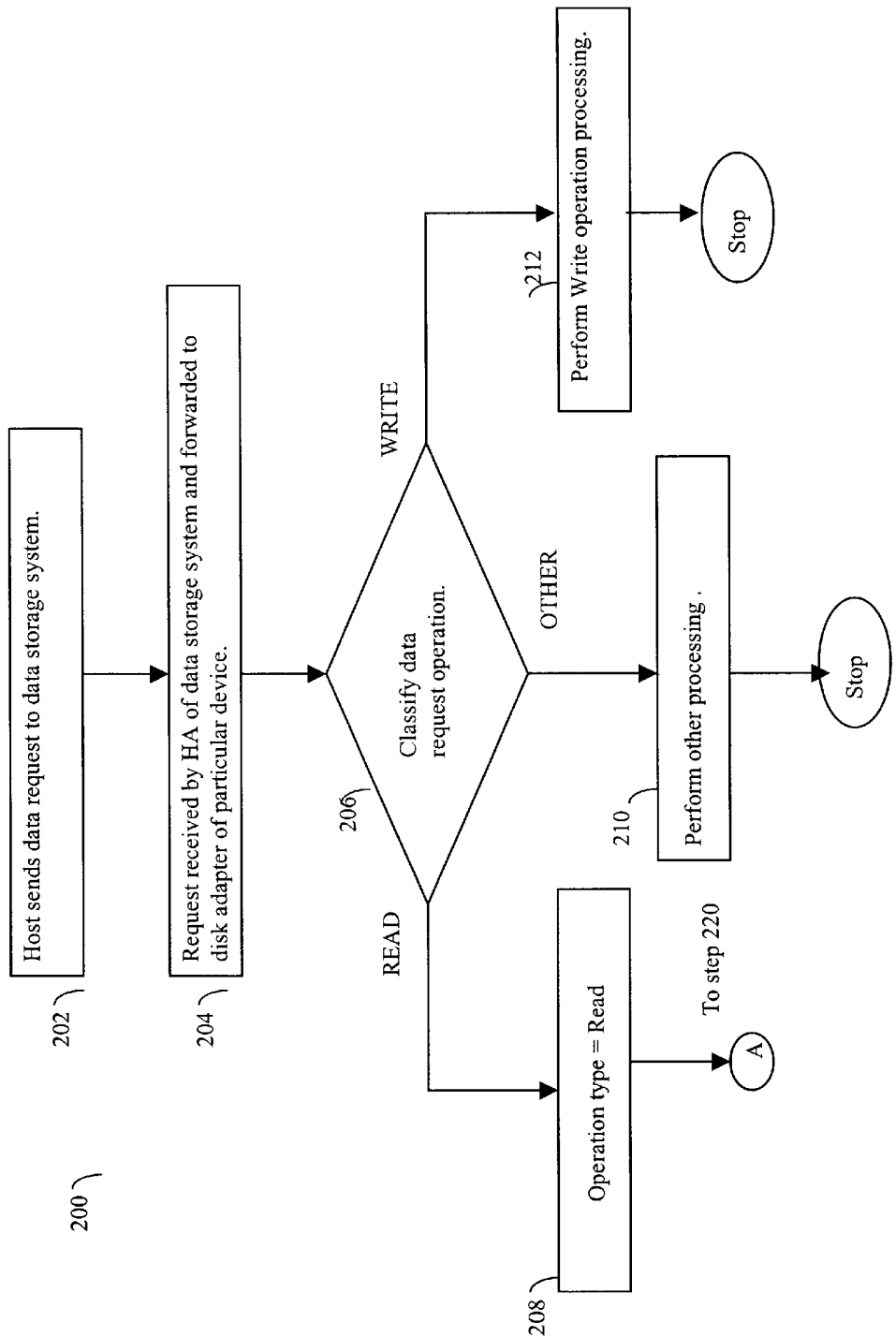
FIGS. 7–11 are flowcharts of steps of methods that may be used in connection with processing a data request in the computer system 10 of FIG. 1.
Figure 8:
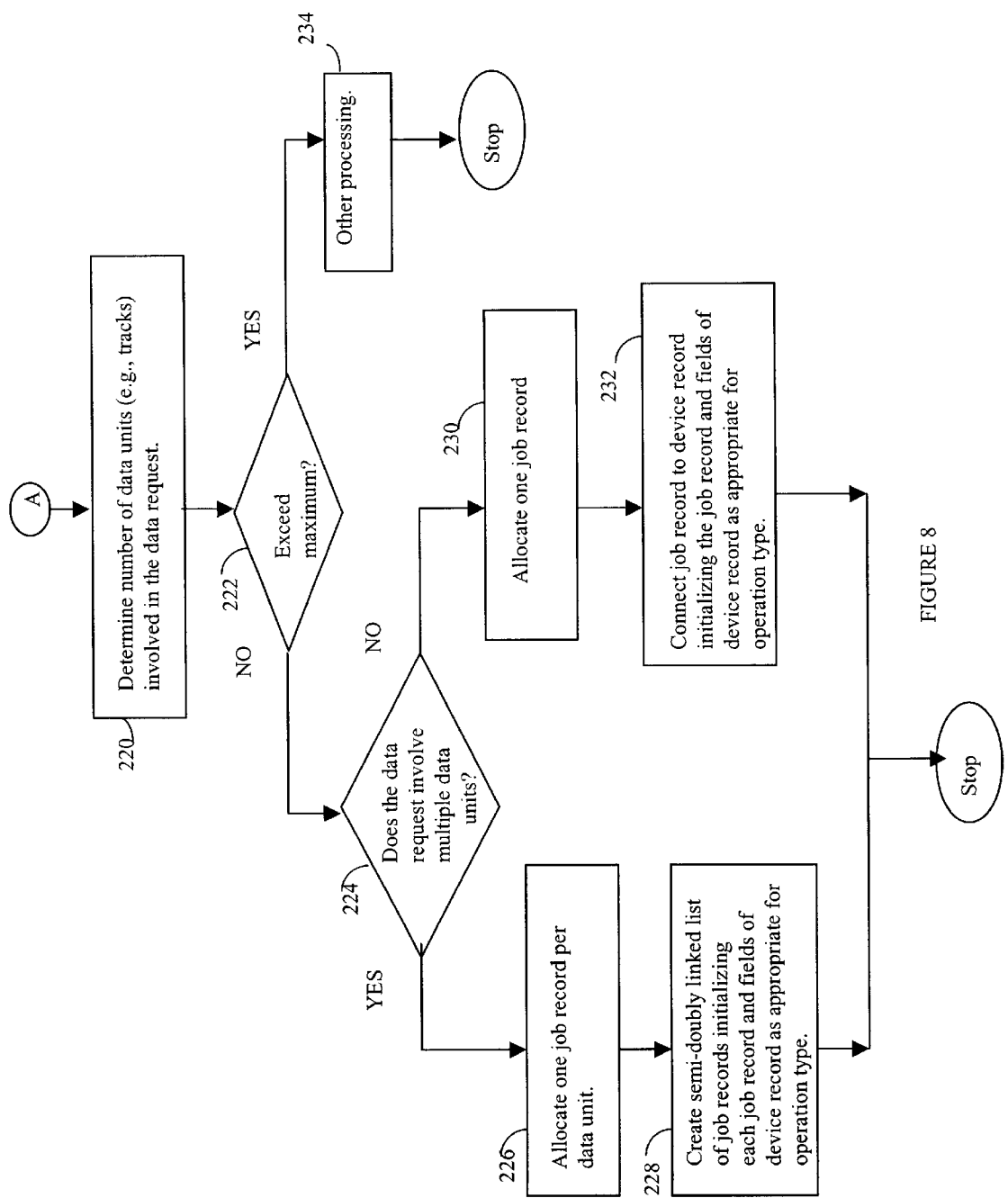

Referring now to FIG. 7, shown is a flowchart of steps of one method that may be executed in connection with processing a data request in a computer system 10 of FIG. 1. At step 202, a host sends a data request to the data storage system. At step 204, the request is received by the host adapter of the data storage system and further forwarded to the disk adapter of the particular device. Control proceeds to step 206 where a determination is made as to the type of data request.

In this particular example, the data request may be a read or a write operation request. Additionally, a data request may be classified as an other type. At step 206, if a determination is made that a data request is for a read operation, control proceeds to step 208 where a variable "operation type" is assigned a value of "read" and control proceeds to step 220. It should be noted that step 220 begins at FIG. 8. At step 220, a determination is made as to the number of data units involved in the data request. For example, as described elsewhere herein, a data unit may be a track on a particular device or volume.

At step 222, a determination is made if the maximum number of job records are exceeded in connection with this data request. In other words, if a job record is allocated for each of these data units for the current data request, is the maximum exceeded such that the number of job records is unavailable for the current data request. Recall that as described elsewhere herein one job record is associated with a particular track of the data request. If a determination is made to step 222 that this maximum is exceeded, control proceeds to step 234 where other processing may be performed. This other processing may include, for example, issuing an error message, telling the host to reissue the request, and the like. The particular steps performed in connection with "other processing 234" may vary in accordance with each particular embodiment.

At step 222, if the maximum number of job records for this particular device has not been exceeded, control proceeds to step 224 where a determination is made if a data request involves multiple data units. If the current data request involves multiple data units, control proceeds to step 226 when one job record is allocated for each data unit, for example, such as when job record is associated with each track on a particular volume. Control proceeds to step 228 where the semi-doubly linked list of job records is created. Each job record is initialized and fields of the device record are also initialized as appropriate in connection with the operation type which in this particular case is a read operation.

If a determination is made at step 224 that the current data request does not involve multiple data units, control proceeds to step 230 where only a single job record is allocated. At step 232, the single job record is associated with the device record. Additionally, the job record and portions of the device record are also initialized as appropriate in connection with the read operation type.

If at step 206, the data request involves a write operation, control proceeds to step 212 where write operation processing is performed. Write operation processing steps associated with step 212 are described in more detail elsewhere herein in connection with other figures.

At step 206 if the determination is made that another type of data operation request other than a read or a write exists, control proceeds to step 210 where other processing may be performed. It should be noted that particular steps included in the embodiment of step 210 may vary in accordance with the embodiment. The other processing may be for example, error processing as well as any other type of operation that may exist in the system.

Figure 9:
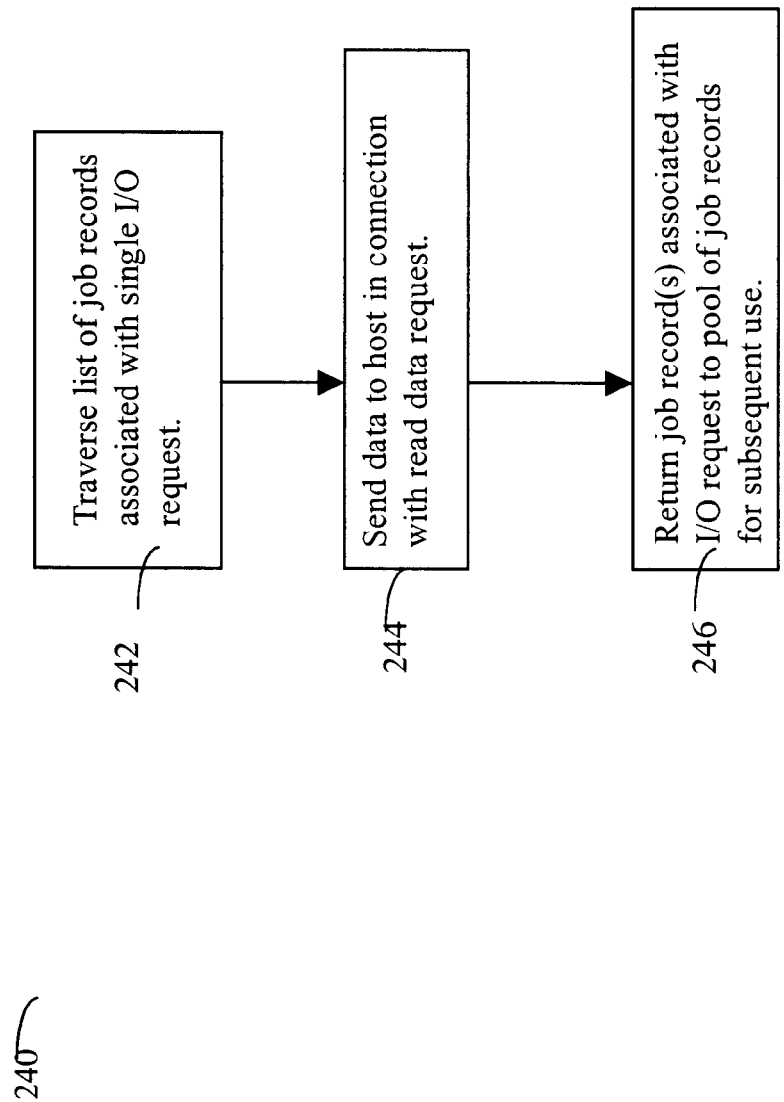

Referring now to FIG. 9, shown is a flowchart 240 of steps of one embodiment using the data structure arrangement, for example, described in connection with FIGS. 5 and 6. The method steps described in flowchart 240 may use the data structure in processing and servicing a data request. At step 242, the list of job records associated with the single data request are traversed in a forward order. Recall that this may be performed, for example, in connection with using the head and next pointers of each of the job records as well as the various array pointers of the array 106. At the completion of step 242, data associated with the single data request for the particular I/O operation representing by the one or more job records has been processed. For example, the data request may be for a read operation in which all of the data associated with the particular data request has been retrieved from a device or cache locations and is now available for forwarding to a requesting host. At step 246, the job records associated with the data request processed at step 242 are returned to the pool of job records for subsequent use.

It should be noted that the data in connection with the read operation may be initially retrieved from a particular data storage device, for example, as referenced by track number on a particular LV. Alternatively, data may be retrieved from a cache or other location. It should be noted that when data is read from a device, it copy may also be stored in another location such as a cache for subsequent references. The particular storage retrieval policies, procedures and techniques may vary in accordance with each particular embodiment.

Figure 10:
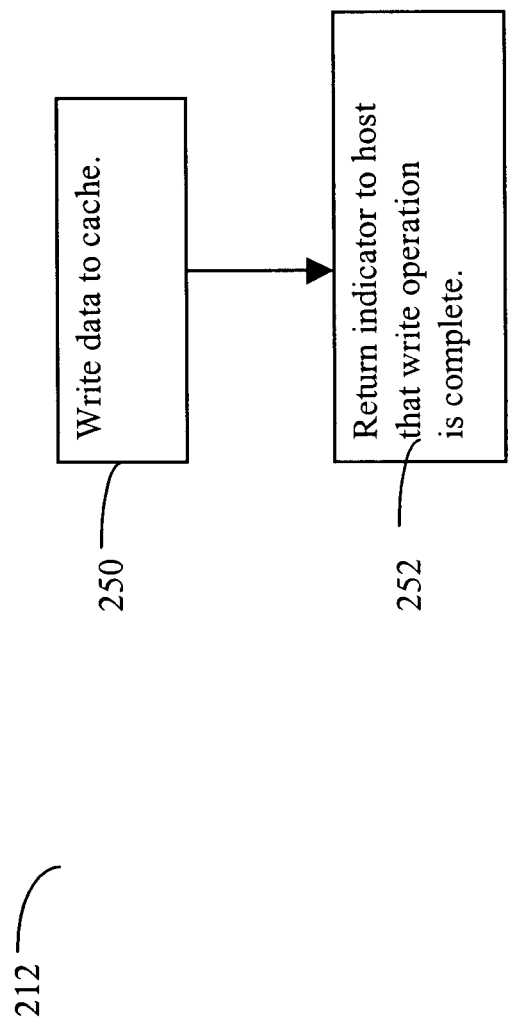

Referring now to FIG. 10, shown is a flowchart of method steps that may be included in one embodiment for performing the write operation processing. The steps of flowchart 212 of FIG. 10 are more detailed steps of the write operation processing step 212 previously described in connection with flowchart 200. At step 250, data in connection with a write operation may be initially written to a data cache. At step 252, an indicator may be returned to the host that the write operation is complete. At this point, the data stored in a cache may be considered a pending write request. In one particular embodiment, data of write operations may initially be placed in a cache as a temporary holding place until the data is actually written out to the particular device location at a later point in time. However, as far as the host issuing in the write operation is concerned, an indicator may be returned to the host indicating that the write operation has completed at the point where the data is written to the cache, but not yet to the device location. It should be noted that other embodiments may employ different policies and techniques in connection with the write operation as well as vary the type and timing of the indicator sent to the host as to when the operation is complete.

Figure 11:
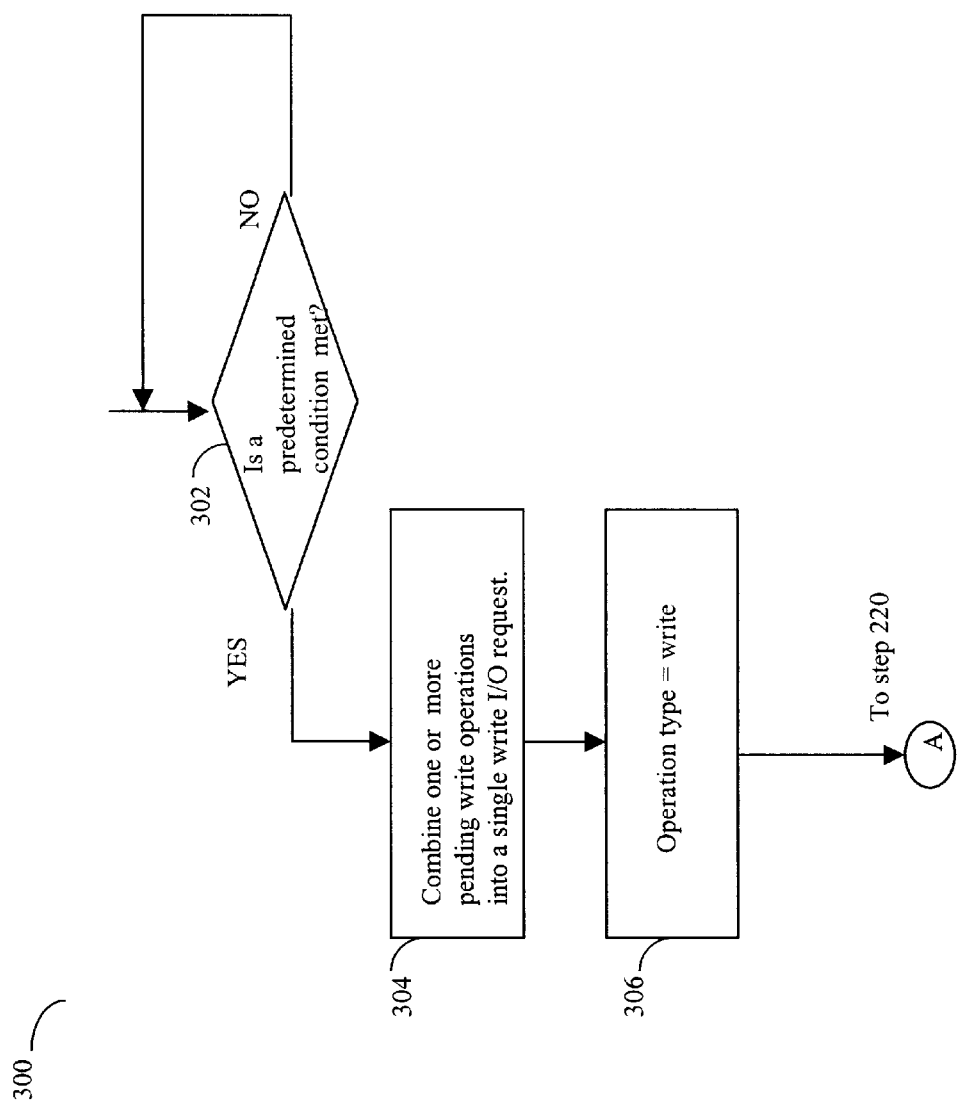

Referring now to FIG. 11, shown is a flowchart 300 with steps that may be included in one embodiment in connection with processing the pending write requests that may be stored in the cache. At step 302, a determination has made us to whether a predetermined condition is met in connection with the pending write requests stored in the cache. The repeated processing and testing at step 302 may be continued until a predetermined condition is met. It should be noted that a particular embodiment may implement any one or more of a variety of different techniques. For example, an embodiment may implement the condition at step 302 be sending an asynchronous signal when any one of a predetermined set of condition(s) occurs. Other embodiments may employ different types of techniques in condition with implementing the loop of step 302.

At step 302, once a determination is made that a predetermined condition is met, control proceeds to step 304 where one or more of the pending write operations may be combined into a single write data request. In other words, a write to each of the particular data units, such as tracks, on a single volume may be combined into a single write data request. Each of the write operations to a particular track is associated with a particular job record creating a data structure, for example, as described in connection with FIG. 6. At step 306, the operation type variable is set to Write and control proceeds to step 220 as previously described in connection with FIG. 8 to create the data structure for this particular operation.

It should be noted that an embodiment may include different definitions for the particular pre-conditions used in the processing of step 302. For example, in one embodiment, a pre-determined condition that may cause pending write operations stored in a cache to be written out to the actual device locations may be due to the amount of space available in the cache. When the amount of available cache space falls below a particular threshold, it may cause the cache to be flushed or emptied to a particular point by writing the actual data from the cache to the device locations.

Different techniques may be used in an embodiment in connection with determining how many pending write operations may be combined into a single write operation. A variable included in a configuration file may be used in determining a maximum number of pending writes that may be combined into a single operation. If the number of pending writes for that device exceeds the maximum number, multiple write data operations may be formed in processing the pending write operations. When forming a single write operation that includes multiple job records, one per track for a device, pending writes to multiple tracks are combined. In one embodiment, the pending writes are in sequential order of increasing track number. However, there may be a gap between any two consecutive tracks where the gap is less than a predetermined amount. In other words, in addition to the maximum number of pending writes that may be combined into a single write operation, an additional consideration is the gap between any two consecutive tracks. If the difference between a first track and a second track on the same device is greater than the predetermined amount, the pending writes associated with each of the first and second tracks are not combined into the same write operation. This predetermined amount may vary in accordance with each particular embodiment and characteristics of each particular device. Use of this predetermined amount may be used in connection with system performance measures and techniques. For example, a larger gap may mean increased time in processing the next job record associated with the single write operation thereby increasing the processing time of the single write operation, It should also be noted that data, for example one connection with a read request, may be stored in any one or more of the variety of locations that may vary with each embodiment. For example, one embodiment may store data that is read to cache as well as send the data read to the requesting host. It should also be noted that embodiments may employ different types of efficiency techniques and heuristics, for example, such as reading multiple blocks of data. This may also vary in accordance with each embodiment.

The foregoing provides an efficient, flexible arrangement and technique for servicing multiple sequential data requests in connection with a single device. Rather than only servicing a single request associated with a particular device or volume prior to servicing a second I/O request, multiple requests associated with a single device or volume may be "in progress", for example, in connection with job record(s) associated with each request. Additionally, the foregoing provides an efficient and flexible arrangement for use in connection with a single data request that involves multiple tracks of data of a single device by providing an arrangement of multiple job records. These multiple job records corresponding to a single data request may be used in connection with "read" and "write" operations.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for servicing a data request in connection with a storage unit comprising:
   determining whether the data request involves a plurality of data units;
   allocating, in response to determining that the data request involves a plurality of data units, a plurality of job records in connection with the data request, each of said plurality of job records associated with a particular one of said plurality of data units, said storage unit including a plurality of said data units; and
   storing a pointer to each of the plurality of job records in a device record associated with the particular storage unit, each of said job records indicating a first of said plurality of job records as a head of a list formed by said plurality of job records, each of said job records indicating which of said plurality of job records follows said each job record in said list.

2. The method of claim 1, wherein said data request is for a read data operation involving multiple tracks of data.

3. The method of claim 2, wherein said read data operation is a read request for a size of data that is larger than a single track of data.

4. The method of claim 2, wherein said read data operation is a read request for a size of data that is not larger than a single track and has data located on more than a single track.

5. The method of claim 2, wherein data associated with said data request includes a portion of data stored in a cache.

6. The method of claim 2, wherein data associated with said data request includes a portion of data stored on a disk.

7. The method of claim 1, wherein each of said job records include a flag indicating which of the plurality of job records is currently being serviced by said storage unit, said flag being true when one of said plurality of job records including said flag is currently being serviced by said storage unit, otherwise said flag is false.

8. The method of claim 1, wherein said storage unit is a logical volume, and said data unit is a track of data included in said logical volume.

9. The method of claim 1, further comprising:
   receiving said data request from a first host computer included in said computer system, said first host computer being one of a plurality of host computers in said computer system accessing said storage unit.

10. The method of claim 9, further comprising:
    receiving the data request by a host adapter included in a data storage system, said data storage system including said storage unit; and
    sending the data request to a disk adapter associated with said storage unit; and
    storing said plurality of job records and said device record in memory local to said disk adapter.

11. The method of claim 9, further comprising:
    receiving a second data request from a second host computer involving said storage unit;
    allocating at least one other job record associated with said second data request; and
    storing a pointer to said one other job record in said device record associated with the particular storage unit.

12. The method of claim 11, wherein a flag is included in each of said plurality of job records and said at least one other job record, each flag being associated with a particular job record and being true when said particular job record is associated with a data request involving more than one job record, otherwise said each flag is false.

13. The method of claim 1, wherein said data request is for a write operation.

14. The method of claim 13, wherein said write operation represents a single request.

15. The method of claim 13, wherein said write operation represents a plurality of pending write requests combined into a single data request for writing data from a cache to said storage unit.

16. The method of claim 1, further comprising:
    traversing a list formed by said plurality of job records only in a first direction in connection with servicing said data request.

17. The method of claim 1, further comprising:

allocating each of said plurality of job records from a pool of available job records; and releasing said plurality of job records upon servicing said data request by returning said plurality of job records to said pool for use in connection with subsequent data requests.

18. A computer program product for servicing a data request in connection with a storage unit comprising:

machine executable code for determining whether the data request involves a plurality of data units;

machine executable code for allocating, in response to determining that the data request involves a plurality of data units, a plurality of job records in connection with the data request, each of said plurality of job records associated with a particular one of said plurality of data units, said storage unit including a plurality of said data units; and machine executable code for storing a pointer to each of the plurality of job records in a device record associated with the particular storage unit, each of said job records indicating a first of said plurality of job records as a head of a list formed by said plurality of job records, each of said job records indicating which of said plurality of job records follows said each job record in said list.

19. The computer program product of claim 18, wherein said data request is for a read data operation involving multiple tracks of data.

20. The computer program product of claim 19, wherein said read data operation is a read request for a size of data that is larger than a single track of data.

21. The computer program product of claim 19, wherein said read data operation is a read request for a size of data that is not larger than a single track and has data located on more than a single track.

22. The computer program product of claim 19, wherein data associated with said data request includes a portion of data stored in a cache.

23. The computer program product of claim 19, wherein data associated with said data request includes a portion of data stored on a disk.

24. The computer program product of claim 18, wherein each of said job records include a flag indicating which of the plurality of job records is currently being serviced by said storage unit, said flag being true when one of said plurality of job records including said flag is currently being serviced by said storage unit, otherwise said flag is false.

25. The computer program product of claim 18, wherein said storage unit is a logical volume, and said data unit is a track of data included in said logical volume.

26. The computer program product of claim 18, further comprising:

machine executable code for receiving said data request from a first host computer included in said computer system, said first host computer being one of a plurality of host computers in said computer system accessing said storage unit.

27. The computer program product of claim 26, further comprising:

machine executable code for receiving the data request by a host adapter included in a data storage system, said data storage system including said storage unit; and machine executable code for sending the data request to a disk adapter associated with said storage unit; and machine executable code for storing said plurality of job records and said device record in memory local to said disk adapter.

28. The computer program product of claim 26, further comprising:

machine executable code for receiving a second data request from a second host computer involving said storage unit;

machine executable code for allocating at least one other job record associated with said second data request; and machine executable code for storing a pointer to said one other job record in said device record associated with the particular storage unit.

29. The machine executable code of claim 28, wherein a flag is included in each of said plurality of job records and said at least one other job record, each flag being associated with a particular job record and being true when said particular job record is associated with a data request involving more than one job record, otherwise said each flag is false.

30. The computer program product of claim 18, wherein said data request is for a write operation.

31. The computer program product of claim 30, wherein said write operation represents a single request.

32. The computer program product of claim 30, wherein said write operation represents a plurality of pending write requests combined into a single data request for writing data from a cache to said storage unit.

33. The computer program product of claim 18, further comprising:

machine executable code for traversing a list formed by said plurality of job records only in a first direction in connection with servicing said data request.

34. The computer program product of claim 18, further comprising:

machine executable code for allocating each of said plurality of job records from a pool of available job records; and machine executable code for releasing said plurality of job records upon servicing said data request by returning said plurality of job records to said pool for use in connection with subsequent data requests.

* * * * *